United States Patent [19]

Tarter

[11] 3,830,325

[45] Aug. 20, 1974

[54] VEHICLE AND VEHICLE CONTROL SYSTEM

[75] Inventor: James H. Tarter, Royal Oak, Mich.

[73] Assignee: Continental Oil Company, Ponca City, Okla.

[22] Filed: Jan. 2, 1973

[21] Appl. No.: 320,333

[52] U.S. Cl............................................. 180/14 A
[51] Int. Cl............................................. B60d 5/00
[58] Field of Search ............... 180/14; 198/96, 109; 299/18; 239/177; 280/404

[56] References Cited
UNITED STATES PATENTS

| | | | |
|---|---|---|---|
| 1,267,742 | 5/1918 | Bulley | 180/14 D |
| 1,302,686 | 5/1919 | Lock | 180/14 A |
| 1,942,637 | 1/1934 | Best | 180/14 D |
| 2,250,933 | 7/1941 | Manierre | 180/14 R |
| 2,922,481 | 1/1960 | Hutter et al. | 180/14 D |
| 3,227,235 | 1/1966 | Budmich et al. | 180/14 A |
| 3,578,096 | 5/1971 | Pearson | 180/14 D |
| 3,623,662 | 11/1971 | Reinke | 239/177 |
| 3,635,300 | 1/1972 | Gibbs | 180/14 A |

FOREIGN PATENTS OR APPLICATIONS

| | | | |
|---|---|---|---|
| 49,471 | 4/1911 | Germany | 180/14 A |
| 581,194 | 11/1924 | France | 180/14 A |
| 1,066,875 | 10/1959 | Germany | 180/14 D |

Primary Examiner—David Schonberg
Assistant Examiner—Terrance L. Siemens
Attorney, Agent, or Firm—William J. Miller

[57] ABSTRACT

A speed and directional control system for a plurality of interconnected carts having a control vehicle and one or more powered vehicles and including a linkage means for interconnecting the control vehicle to the powered vehicles; yieldable means intercoupling the vehicles and the linkage means to permit biased movement of the vehicles along the axis of the linkage means; load sensing means being interconnected at each of the vehicles between its yieldable means and the vehicle to provide an output proportional to the biased movement of the vehicle with respect to a centered position. A command means on the control vehicle generates commands which indicate the direction of movement of each of the vehicles and which indicate the rate of the movement. Means are provided for communicating the direction and the rate commands to each of the powered vehicles. Means for coupling the load sensing means output to the rate command generate a combined signal which is applied to each of the powered carts for controlling the speed or rate of movement of the carts.

10 Claims, 13 Drawing Figures

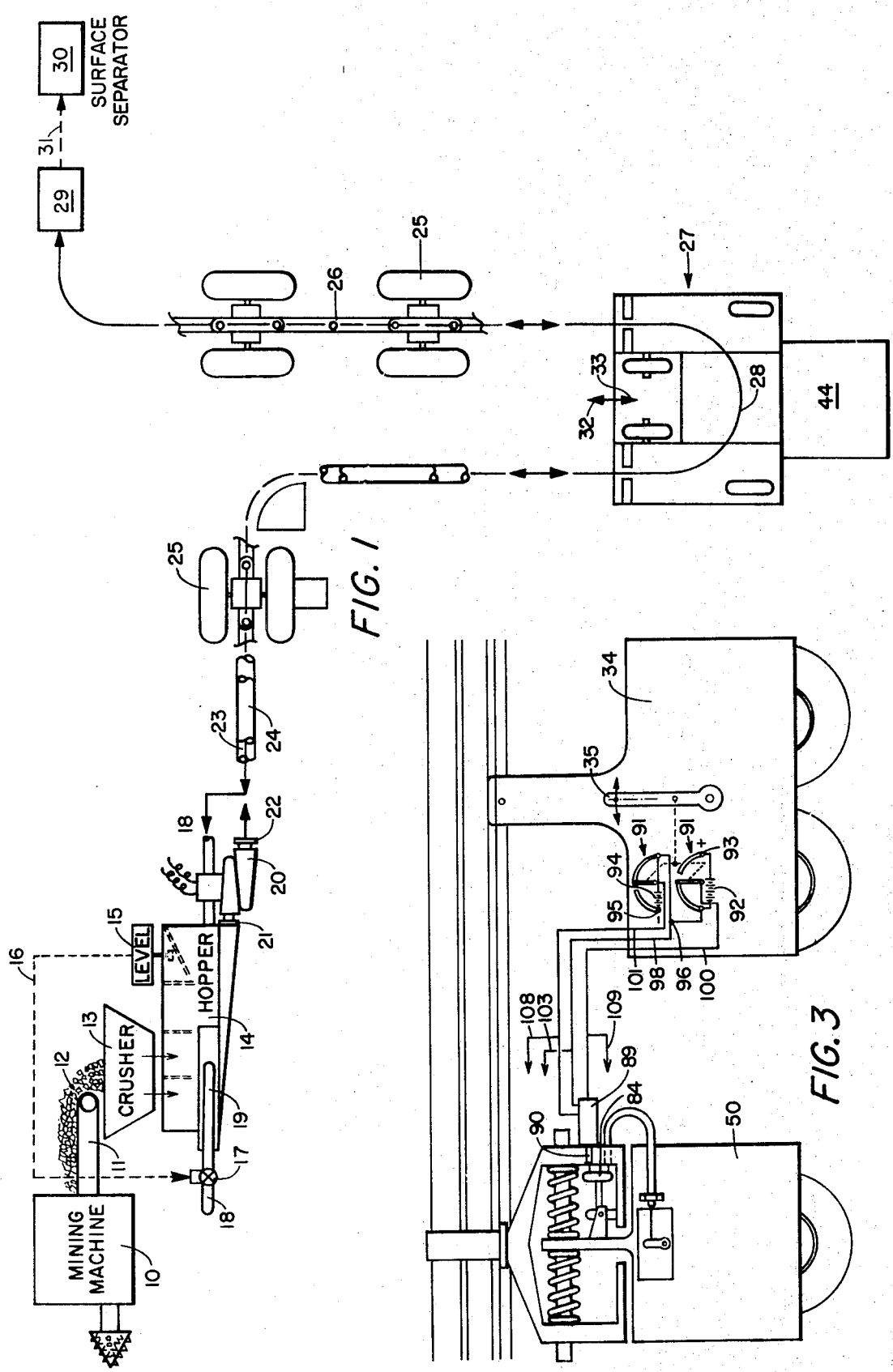

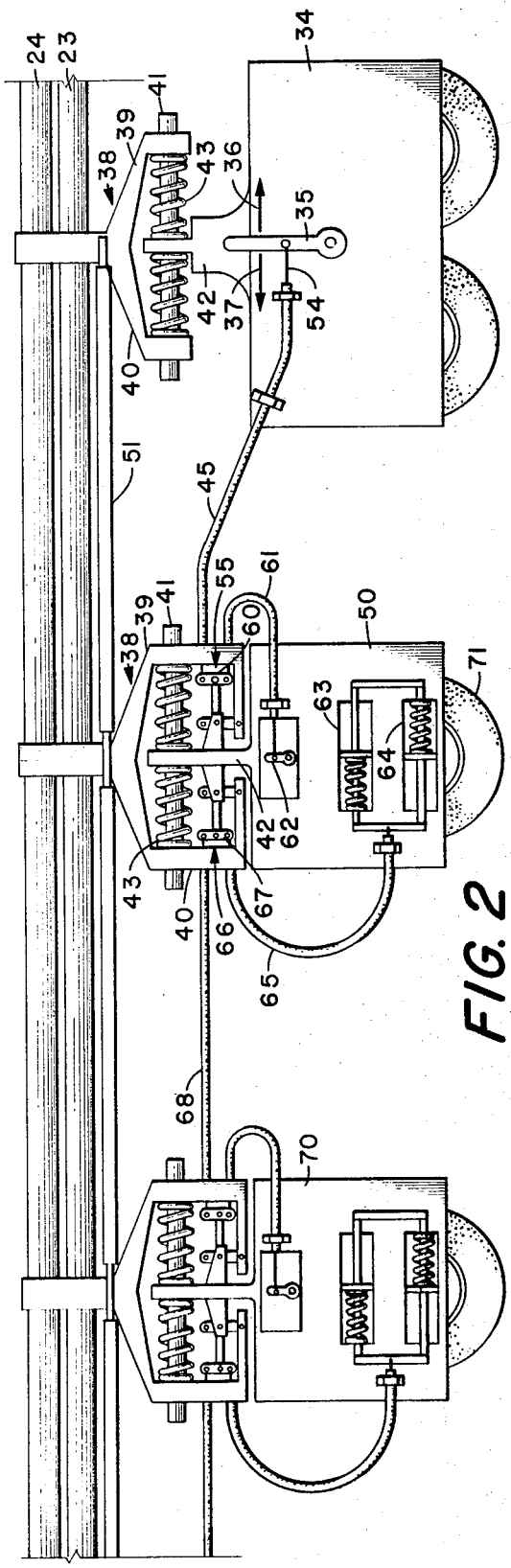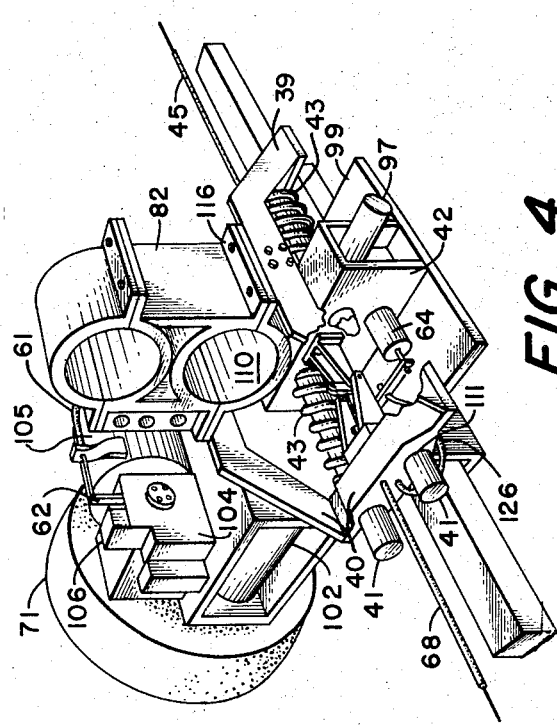

DIRECTION OF
VALVE OPENING

3,830,325

VEHICLE AND VEHICLE CONTROL SYSTEM

BRIEF DESCRIPTION OF THE INVENTION

This invention relates to a method for controlling both the direction and speed of a plurality of interconnected carts with a command vehicle. The command vehicle will determine the direction that the interconnected carts are to travel and communicate the direction to each of the carts, either in a series fashion or in a simultaneous fashion; that is, the command signal can be given to the cart directly behind and that cart will transmit the signal to the cart behind it in a series fashion or each of the carts can be given the command signal simultaneously.

A yieldable means is provided between the cart and the interconnecting linkage in order to provide a control over the power each cart applies to the linkage. A response system is incorporated which measures the movement of the cart along the axis of the hose as a consequence of the yieldable means, and this movement is applied along with the command to the cart, resulting in an output which will control the cart at a rate proportional to the overall power requirements.

DISCUSSION OF THE PRIOR ART

The best prior art relating to the above system is found in U.S. Pat. No. 3,260,548, entitled "Method and Apparatus for Continuously Mining and Transporting Coal" by E. H. Reichl. In the patent a coal digging machine is connected to a terminal through a pair of flexible pipes. These flexible pipes are nonsupported but have a slightly greater length than they needed to go from the termination of the fixed pipes to the coal digging machine. Thus some storage is provided by the excessive length of the hose. The invention thus disclosed, however, does not take into consideration the excessive wear which will result from hoses which are made principally of steel reinforced rubber. These hoses may weigh as much as 100 pounds per foot when full, and movement of a hose of this weight over the rough surface of a mine passage floor will result in early failure of the hose. Furthermore, when the mining machine makes a 90° turn, there is noway to successfully move the hose around the turn.

Most mines in the past have incorporated the use of conveyers of one form or another to handle the large quantity of coal being produced by the automatic digging machine. Many attempts have been made to interconnect these conveyers in an effort to form a continuous movement of coal from the coal digging machine to a centralized conveyer system. Such a system is shown in the U.S. Pat. to Heimaster, No. 3,301,599, and Cartlidge, No. 2,674,364. These conveyer systems, however, have not proved very satisfactory, since no suitable method has been devised for storing a conveyer so that as the coal digging machine progresses into the room being mined the conveyer cannot follow the machine. While efforts have been made to solve the problem of conveyer storage, such as yet remains generally unsatisfactory.

The U.S. Pat. to Densmore, No. 3,362,754, conceives the use of a pipe supported by wheels which could conceivably follow a coal digging machine to a small extent. This patent discloses the concept of using one or more telescoping tubes. The patent did not conceive, however, of a method whereby the coal digging machine could progress for extended periods of time into one or more rooms without requiring the changing or reorganizing of the coal removal apparatus.

None of these patents discloses a system for controlling the speed of a plurality of interconnected conveyers or slurry systems.

BRIEF DESCRIPTION OF THE FIGURES

FIG. 1 is a schematic layout of the hose hauling system, its interconnection with the powered carts and with the digging machine;

FIG. 2 is a drawing illustrating the method of controlling the rate and direction of movement illustrated in the preferred embodiment of this invention;

FIG. 3 illustrates a method for controlling the rate and speed through simultaneous activation of all powered carts;

FIG. 4 is a perspective view of a powered cart;

FIG. 5 is a top view of the powered cart illustrated in FIG. 4;

GENERAL DESCRIPTION OF THE INVENTION

Figure 6:
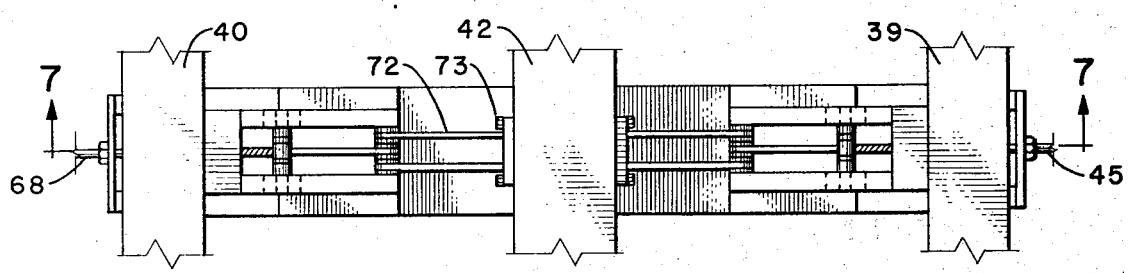
FIG. 6 is a top view of a load sensing means.

The same numbers will be used throughout the specification for the same or similar parts.

Referring to all of the drawings but in particular to FIG. 1, a mine digging machine 10 has the product loosened by machine 10 and picked up by a conveyer 11. The product 12 is dropped into a crusher 13, which may be any usual type crusher such as a roll crusher or jaw crusher, and may include means for separating the material that does not need to be crushed and crushing only the larger material. Crushers are well known and will not be further discussed. The material from the crusher is dropped into a hopper 14 which contains water. A water level control 15 applies a continuous signal through line 16 to a valve 17 which is connected to a water line 18. Water line 19 is also connected to valve 17 and to a plurality of slots (not shown) which communicate with the interior of the hopper. The hopper illustrated herein is for the purposes of assisting in the understanding of the invention and is the subject matter of a patent application entitled "Slurry Hopper System," Ser. No. 389,272, filed Aug. 21, 1973, and is copending with this application.

A slurry pump 20 has its inlet connected to the outlet 21 of hopper 14. Slurry pump 20 has an outlet 22 connected to a slurry hose 23. Hose 24 is connected to water line 18. Both hoses 23 and 24 are supported upon a slurry transportation system which essentially comprises a plurality of carts 25 connected by linkage 26. A conveyer 27 controls the movement of the carts, linkage and pipe assembly around 180° turn 28. The termination of the water hose 24 and slurry hose 23 is at a remote terminal 29. A surface separator 30 may be connected to remote terminal 29 through any well known system 31 such as a pipe line.

The operation of the overall system functions as follows:

As the mining machine 10 removes product 12, it is carried up by conveyer 11 and passed to crusher 13 where it is deposited in hopper 14. Pump 20 pulls the slurry mixture from the hopper and passes it into line 23 where it is eventually received at a remote terminal 29, pumped to the surface through pipe line 31, and separated by separator 30. As mining machine 10 works in and out of the coal seam, the slurry hose must follow these movements. Cart 25, through a servo mechanism, will follow the in and out movements of the mining machine. A portion of the slurry line between the conveyer 27 and the remote terminal 29 functions as a storage. Thus as additional length of hose is needed, conveyer 27 will move in the direction of arrow 32, shortening the amount in storage and lengthening the amount of slurry hose which can penetrate the mine room with the mining machine. In order to accomplish the above, however, conveyer 27 must move the carts 25, including the slurry hose supported by it, from the position in storage to a position where it can be utilized by the mining machine. Conveyer 27 accomplishes the transition from storage to active use by lifting the carts 25 upon the conveyer surface 27 and moving the carts through 180°. The conveyer 27 will move in the direction of arrow 33 when additional storage is needed or in the direction of arrow 32 when less storage is needed. The conveyer further restricts the hose to a definite radius, thereby preventing excess flexing or bending.

DIRECTION AND RATE CONTROL SYSTEM

In order to control the direction and rate of a plurality of interconnected carts or vehicles as previously described, a command vehicle (referring to FIG. 2) 34 usually has a manual lever 35 which is connected to its own internal hydraulic system (not shown). Movement in the direction of arrow 36 will normally cause the command vehicle 34 to proceed forward while a movement in the direction of arrow 37 will generally cause the command vehicle 34 to move backward. Command vehicle 34 supports a slurry hose system having hoses 24 and 23 as previously described. The aforementioned hoses are supported by a yoke assembly 38 having arms 39 and 40. A pair of shafts 41 is secured to a mounting 42 which is attached to cart 34. A yieldable means such as springs 43 is axially mounted over shaft 41 and between mounting 42 and yoke arms 39 or 40. A control rod 45 couples manual lever 35 to the next preceding cart 50. Cart 50 likewise includes a yieldable means comprising a yoke 38, springs 43 and a pair of shafts 41. Linkage means 26 pivotally interconnects the yoke of cart 34 and each succeeding cart in the train of carts.

A load sensing means generally referred to as 55 is coupled between arms 39 or 40 and mounting 42. A detailed description of loading sensing means 55 will be given in a subsequent portion of the specification.

Control rod or cable 45 comprises an outside sheath and an inner control rod 54 which is directly connected to manual lever 35 and a link 60 which is a part of load sensing means 55. A second control cable 61 has its control rod coupled between the remaining half of link 60 and the control lever 62 of cart 50. Control response pistons 63 and 64 are operably coupled to a hydraulic control system which will be subsequently described. A third control rod 65 is coupled between the hydraulic control piston output of pistons 63 and 64 to a second load sensing means generally referred to by number 66. Second load sensing means 66 likewise has a linkage 67 coupled to control rod 65. A fourth control rod 68 is coupled in a fashion similar to control rod 45 to the next preceding cart 70. The interconnection and operation of cart 70 are identical with that of cart 50 and will not be further described. Each cart 34, 50, and 70 also contains driving wheels 71.

The operation of the system is as follows:

As command vehicle 34 is given a command by moving manual lever 35 in the direction of arrow 36, control rod 54 will pivot linkage 60, causing control lever 62 to move in the same direction as control lever 35. Movement of lever 62 will cause a hydraulic pressure to activate the motors driving wheel 71. Simultaneously with the activation of wheels 71, cylinder 64 is pressurized, causing the control rod 65 to pivot linkage 67 operating control rod 68 through the linkage of cart 70, resulting in its control lever being actuated. As power is applied to wheel 71, pressure is applied against springs 43, deflecting the springs, permitting cart 50 to move in the direction of cart 34. Deflection of the springs 43 will apply pressure to the interconnecting linkage 68. Each cart following cart 50 will likewise compress springs 43, applying pressure against the linkage. When enough pressure is applied by enough carts, all of the carts will begin to move, taking with them the slurry hoses 24 and 23, respectively, and linkage 51. When cart 50 compresses springs 43, load sensing means 55 is designed to reduce the input of control cable 61 to control lever 62. This action will prohibit too much power being applied by cart 50, resulting in a spinning of wheels 71. Only when enough carts have applied sufficient power for the length of slurry line being activated will all of the carts begin to move.

DETAILED DESCRIPTION OF THE LOAD SENSING MEANS

Referring to FIGS. 4 and 5, a powered cart having the load sensing means incorporated therein is illustrated. A powered cart essentially consists of a chassis or mounting frame 99 and drive wheels 71 coupled to hydraulic motors 102 through a shaft 97. A hydraulic pump 104 is driven by an electric motor 105. Power is supplied to motor 105 through cable entry 107. Control level 62 is coupled to the hydraulic pump 104 which provides fluid control to hydraulic motors 102. The control lever 62 is coupled to valve 106 and is capable of controlling the speed of motors 102 from a stopped position to full power in either direction. Level 62 is controlled by control rods, for example, 61, which are coupled to the vehicle in front of the vehicle illustrated. A hose mounting bracket 110 is attached to frame 99 through arms 39 and 40 which are journaled in bearings 111 to shafts 41. Shafts 41 are secured to mounting 42. Springs 43 are positioned concentrically on shafts 41 on each side of axle housing 42. Hose clamps 82 are mounted through screws 116 to the hose mounting bracket 110. Control cable 61 is coupled from load sensing means 55 to valve level 62, and a control rod or cable 65 is coupled from second load sensing means to pistons 63 and 64. Control rod 68 is coupled from the second load sensing means 66 to the next preceding vehicle.

The operation of the powered carts is as follows:

Power is applied to a cable entry 107 which is connected to electric motor 105, energizing same, which operates hydraulic pump 104. This pump creates a hydraulic pressure which is controlled by valve 106. Any movement of control cable 61 will cause lever arm-62 to pivot forward or backward, permitting flow of hydraulic fluid to hydraulic motors 102. Each wheel 71 has its own hydraulic motor. Thus, as valve 106 is operated, the hydraulic fluid will pass to motors 102, causing them to rotate clockwise or counterclockwise and with a horsepower proportional to the number of degrees valve lever 62 is moved; and the direction of rotation will be dependent upon the direction from neutral that lever 62 is moved.

Figure 7:
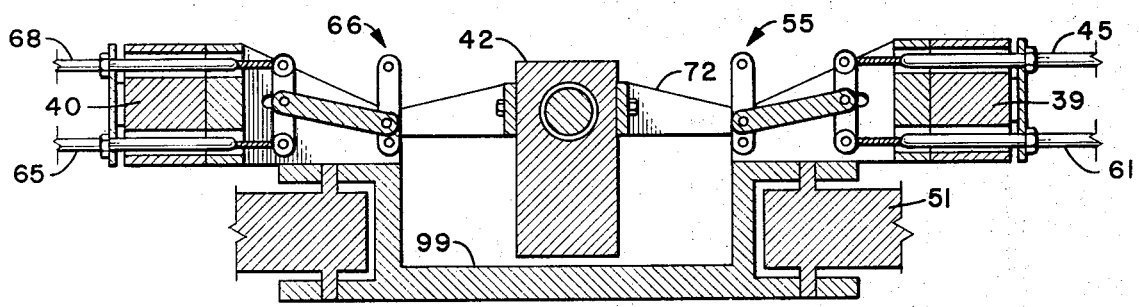
FIG. 7 is a side view of the load sensing means illustrated in FIG. 6.
Figure 8:
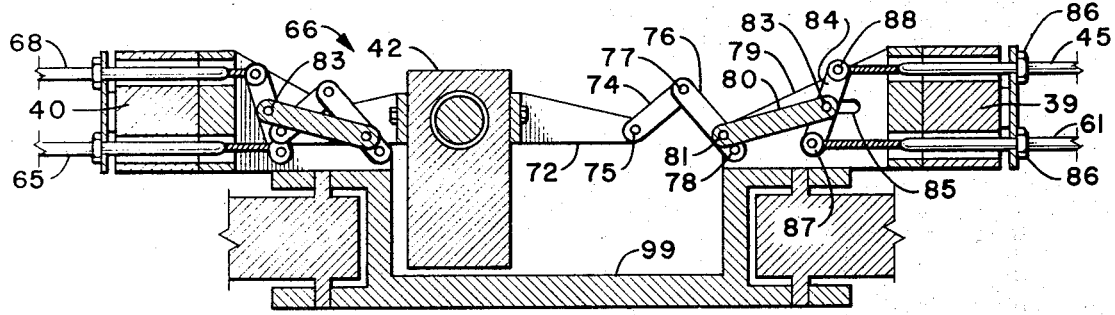
FIG. 8 is a side view of the load sensing means illustrated in FIG. 6 and further illustrating the movement of the linkage responsive to an increase in load requirements.

Referring to FIGS. 6 through 8, a detailed operation of the linkage mechanism is illustrated. For simplicity the unnecessary portions of a powered cart are not included in the drawings. Those elements of the speed control which have not been previously described essentially comprise a bracket 72 which is attached to mounting 42 by any usual means such as bolts 73. A double linkage (see FIG. 8) 74 is attached to a pivot 75 through bracket 72. A second double linkage 76 is pivoted at 77 to linkage 74 and further pivoted at 78 to an extension 79 of chassis 99. A third single linkage 80 is pivoted at 81 to linkage 76 intermediate pivots 78 and 77. This pivot point determines the deamplification of the linkage and can be moved in order to adjust for proper operation of the linkage. The other end of single linkage 80 is attached by means of a sliding pivot 83 to a balanced double linkage 84. Sliding pivot 83 is secured to extension 79 through a slot 85.

Control rods 45 and 61 are attached to the arms 39 by any usual anchoring means such as nuts 86. The control rod is anchored to double linkage 84 by any usual means such as rings 87 and a bolt 88. Bolt 88 may also be a pin or other ordinary method of anchoring the control rods.

OPERATION

The operation of the linkage described in FIGS. 6 through 8 is as follows:

Referring particularly to FIGS. 6 and 7, when mounting 42 is centrally located by the cart being at rest, the load sensing means 66 and 55 are both in a centered position. Any movement of control rods 45 or 65 will cause a 1:1 movement of control rods 61 or 68; however, when the command cart generates an output commanding the carts to move, control rod 45 will be operated, likewise causing control rod 61 to be operated. This operation will result as previously mentioned in lever 62 on cart 50 being moved. Wheels 71 will then force mounting 42 in either direction from neutral.

In FIG. 8 the mounting is shown as moving to the left of neutral indicating that the command cart has signaled for the carts to proceed in reverse. This movement will cause load sensing means 55 to extend, pulling linkage 84 in the direction of the movement of mounting 42. Load sensing means 66 will be in a compressed state, moving piston 83 likewise in the direction of mounting 42. Movement of the load sensing means 55 will cause a shift in the position of control rods 61 and 45.

Referring to FIG. 2, as cart 71 moves away from command vehicle 34, control rod 45 must pull linkage 84. This movement will reduce the command given to cart 50. Also, the shift in the mounting 42 through load sensing means 55 will cause reduction in the command given to lever 62. The system is designed so that under full compression of springs 43 or 42 the lever 62 on cart 50, for example, will be returned to neutral. This will prevent spinning of wheels 71. It should be remembered, however, that cart 50 is exerting pressure on linkage 51, and this pressure, along with the pressure generated by other carts, will cause the system to move. Once linkage 51 has sufficient force on it to move, the command signal being given lever 62 will increase for two reasons; first, some of the tension will be released on springs 43 or 42, causing cart 50, for example, to move closer to vehicle 34, and second, load sensing means 66 or 55 will be moved nearer to neutral position, causing a movement in control rod 61 which will increase the angle of control lever 62. Both movements then will cause an increase in the speed of the carts and the command vehicle.

PARALLEL SPEED CONTROL SYSTEM

Referring to FIG. 3, a parallel speed control schematic is illustrated. On each cart, for example cart 50, is mounted solenoid 89 having a plunger 90 connected to linkage 84 in the same manner as control rod 45 was connected to linkage 84. Solenoid 89 is of the double acting type where a signal of one polarity will move plunger 90 in one direction and a signal of the other polarity will move plunger 90 in the opposite direction.

Vehicle 34 has incorporated therein a command system comprising control lever 35 and proportional control rheostat 91. A battery 92 has its positive pole connected to terminal 93 of rheostat 91, and a second battery 94 has its negative terminal connected to terminal 95 of rheostat 91. The negative terminal of battery 94 and the positive terminal of battery 92 are connected to a grounding point 96. Wire 98 is connected between the grounding point 96 and the neutral of solenoid 89. Wire 100 is connected between the positive terminal 93 of rheostat 91 and one portion of solenoid 89. A third wire 101 is connected between the negative terminal 95 of rheostat 91 and the other side of solenoid 89. Wires 103, 108, and 109 are connected to corresponding portions of the solenoids in subsequently powered carts.

The operation of the system is similar to the operation of the system described in FIG. 2 with the exception that all carts receive a signal simultaneously rather than in series.

ELECTRICAL CONTROL

Figure 9:
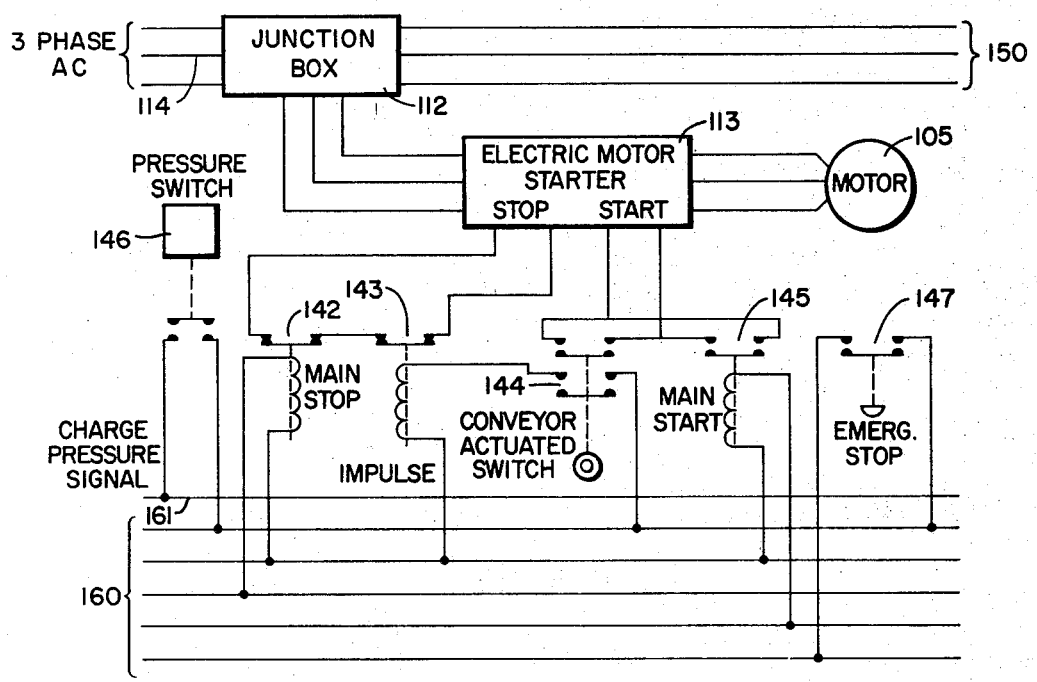
FIG. 9 is an electrical schematic for a powered cart.

The electric control for the carts is illustrated in FIG. 9. The electrical components are, in the preferred embodiments of this invention, distributed among two vehicles with a junction box 112, a motor starter 113, and relays 142, 143, and 145 mounted on an unpowered vehicle (not shown) in an explosion-proof box. A pressure switch 146, a conveyer switch 144, and emergency stop 147 are mounted on the powered vehicle. A three-phase a.c. line 114, which may, for example, be 575 volts, is used to operate electric motors 105, and is transmitted along the hose line in electric cables 150.

The operation of the above is as follows:

Starter 113 is energized by closing a relay 145 across its starter terminals. It is stopped by opening a set of normally closed contacts 142 across its stop terminals. A stop signal will override a conflicting start signal. These relays are controlled from one or both ends of the hose lines. At this time it is presumed that primary electric control will be from the fixed end of the hose line, but the system accommodates control from the pump vehicle end also. Actuation of a switch at the control end of the hose line will actuate all start relays 145 or all stop relays 142 simultaneously. This will start or stop all hose line electric motors except those on the stationary side of the loop.

Vehicles on the stationary side of the loop are parked, and it is not desired that the electric motor on these vehicles be started until they pass over the traveling conveyer. A conveyer actuated switch 144 is mounted on each powered vehicle which is actuated when the vehicle passes over the central part of the conveyer. This switch, which is normally open, has a dual set of contacts. One set of contacts is placed across the start terminal of the starter. The other set of contacts is used to control an impulse relay 143 placed in series with the main stop relay 142. An impulse relay is a mechanically latching relay whose contacts open and close on alternate actuation pulses; that is, if the impulse relay contacts are closed and the voltage is applied to its coil, the contacts open. The next time a voltage is applied to the coil, the contacts again close. Since latching is mechanical, the impulse relay stays in the condition to which it was last actuated even though all electric power is turned off. This enables a powered vehicle to remember which side of the conveyer it is on. When the vehicle is on the parked side of the loop and travels over the conveyer, the conveyer operated switch 159 closes the impulse relay and a start signal is applied to the starter. On coming back, the impulse relay is actuated and its contacts open, shutting off the motor.

The emergency stop switch 147, installed on all powered vehicles and possibly on all idler vehicles, will be a normally open switch, which when manually actuated will send a signal back to the main control station which can be used to shut down all electric power to the hauler vehicle system. The emergency stop switch could also be hooked up to shut down all electric power to the working face. With this switch an individual anywhere along the line may shut down the whole system if difficulty develops.

A pressure switch 146 will be installed on the charge pump of each hydrostatic transmission. This pressure switch, which is normally open, closes when the charge pump pressure is at the nominal value. This pressure switch transmits a voltage signal back to the main control system which can be used to light a panel lamp which will give the operator visual indication of the status of the system. He will thus have a primary indication that a vehicle is functional and will also have an indication of the location of the traveling conveyer.

Control of the electric motors will require five lines 160 running the length of the system. An additional line 161 running the length of the system for each pressure switch will also be required.

HYDRAULIC PUMP CONTROL

Figure 10:
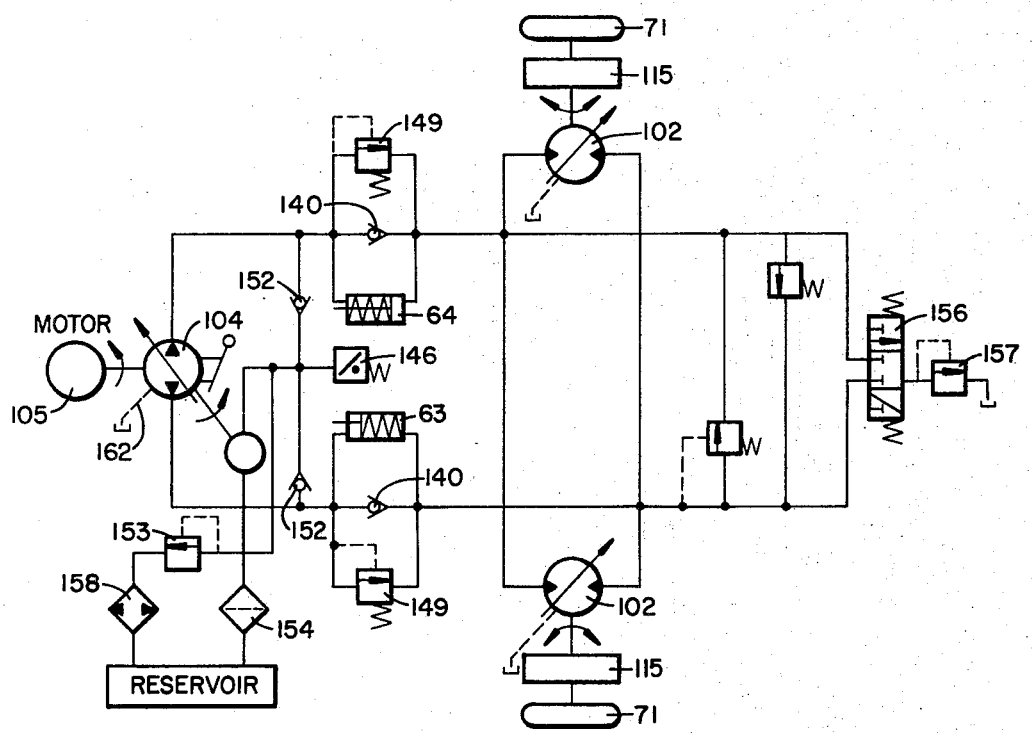
FIG. 10 is a hydraulic schematic for a powered cart.

Referring to FIG. 10 the hydraulic pump control system is described.

FIG. 10 shows the schematic of the power train. The wheels in the schematic are driven through a transmission 115 by the variable displacement motors 102. The hydraulic motors are supplied by a variable displacement pump 104. The pump is driven by electric motor 105. A charge pump 151 is mounted on the same shaft with the variable displacement pump 104 and supplies the makeup flow required in the closed-loop circuit between the hydraulic motors and pump. Check valves 152 are used to isolate the charge pump output from the high pressure side of the pump-motor circuit. The relief valve 153 is used to dump the excess charge pump flow from the loop when the hydrostatic transmission is in neutral. A pressure switch 146 is used for remote monitoring of the charge pump output pressure, producing an electric signal which lights a pilot lamp at the fixed end of the hose line and gives the operator at this location an indication of those vehicles which are powered. The charge pump is supplied from the reservoir through filter 154.

The vehicle control system requires a signal which is a measure of the hydrostatic transmission flow which is indicative of powered vehicle speed. This signal is obtained by a flow sensor 149 which is functionally equivalent to a relief valve with a very low setting or a check valve. The pressure drop across flow sensor 149 is approximately proportional to the two-thirds power of flow. The pressure drop across flow sensor 149 is applied to control cylinders 63 and 64. Check valves 140 are used to permit return flow in the hydrostatic transmission loop without forcing reverse flow through sensor 149.

If flow is allowed to circulate in the hydrostatic transmission loop indefinitely, excess heating of the oil and components will result. Hence, fresh oil must be supplied to the loop. A shuttle valve 156, actuated by the pressure differential across the hydrostatic transmission, is used to connect the motor input side of the loop to a relief valve 157. Hence, when the hydrostatic transmission is operating, excess charge pump flow is returned to the reservoir through relief valve 157. Thus fluid is continually removed from the hydrostatic transmission loop and is continually replaced by fresh fluid from the charge pump 151. Fluid is returned to the reservoir through a pump shaft mounted air-cooled oil heat exchanger 158 which removes excess heat from the system.

Figure 11:
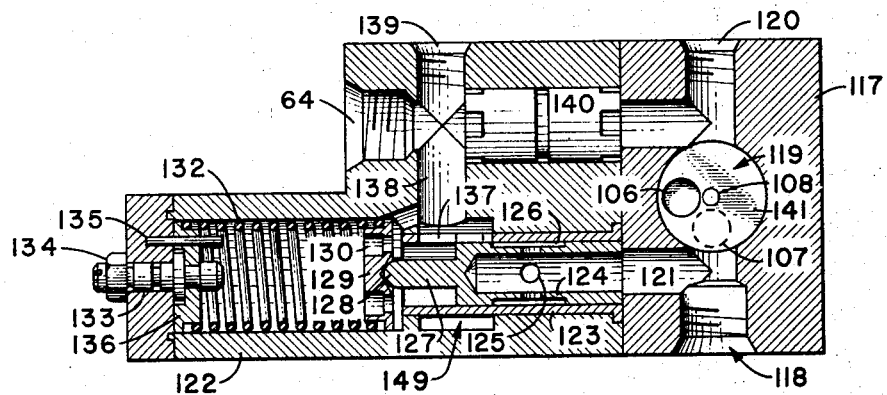
FIG. 11 is a cross-sectional view of a pressure responsive control valve.
Figure 12:
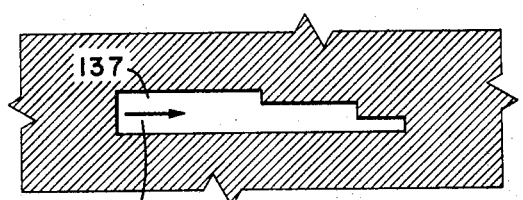
FIG. 12 is an enlarged view of a hydraulic orifice utilized in FIG. 11.
Figure 13:
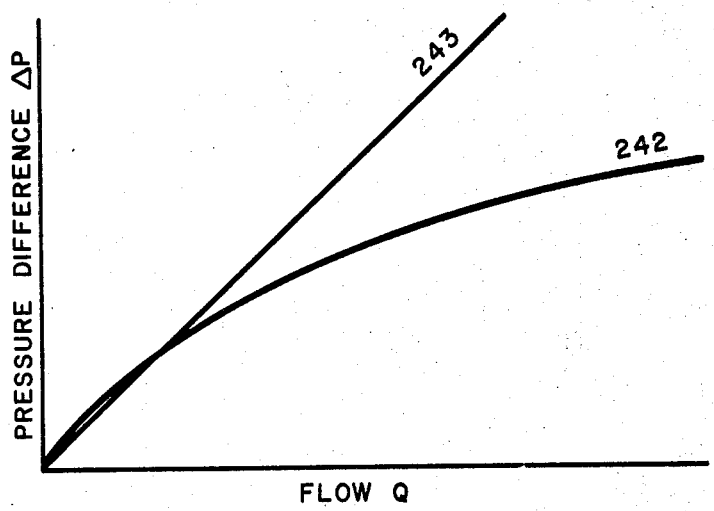
FIG. 13 is a graph of the change in pressure versus flow rate for the valve illustrated in FIGS. 11 and 12.

The flow sensor valve utilized in FIG. 10 is more clearly illustrated in FIGS. 11, 12, and 13 and essentially comprises an inlet housing 117 having an inlet port 118, a function valve 119, a first outlet valve 120, and a port 121 which is coupled to the inlet port 118. A second valve housing 122 contains the flow sensor valve which comprises a sliding valve cylinder 123 having a sliding valve 124 therein. Sliding valve 124 has a plurality of circular ports 125 which opens to circumferential recess 126. An end portion 127 is closed and has tip 128 connected to a piston 129. Ports 130 permit free passage of oil behind piston 129. A spring 132 provides a bias for piston 129. A spring bias adjusting means includes a screw 133, a nut 134, pin 135 and pressure plate 136. A specially cut port 137, which will be described later, communicates with outlet port 138.

A second outlet 139 is connected to first outlet 130 through a check valve 140. Valve 119 includes therein a communicating port 141 which can be lined up with inlet port 118 and outlet port 120 for the purpose of by-passing the function sensor. In the position illustrated in the drawing, the hydraulic fluids must pass through the flow sensor valve.

OPERATION

The operation of the flow sensor valve is as follows:

Hydraulic fluid entering inlet 118 will pass through port 121 and to the interior of sliding valve 124. The pressure will be applied to the end of the valve 124, forcing valve 124 in the direction of spring 132, compressing the spring. As the spring is compressed, fluids will pass into circular port 125 and into circumferential recess 126. As the circumferential recess passes into the opening of special port 137, hydraulic fluid will pass through port 138 to outlet port 139. The pressure caused by spring 132 against piston 129 can be varied by moving pressure plate 136 by a simple adjustment of screw 133. Special port 137, along with the spring bias from spring 132, is designed to linearize the hydraulic response of the valve.

Referring to FIG. 13 the ordinary response of a hydraulic valve is illustrated by solid line 242. The response from the flow sensor valve follows line 243. In order to make the valve follow such a response, it was discovered that, if the valve could be designed in accordance with the following mathematical relationship, then the valve would have a linear response:

flow = constant times the differential pressure or $Q = C_1 \Delta P$ (1)

then for a metering slot: $Q = KA \sqrt{\Delta P}$ (2)

where $K$ = constant and $A$ = area of metering slot substituting equation 1 into equation 2: $A = (C_1/K) \sqrt{\Delta P}$ (3)

where $\Delta P$ is proportional to travel $X$ of piston 124

$A = C_2 \sqrt{X}$ (4)

When the mathematical relationship was determined, the port 137 was cut to correspond so that its area corresponded to the curve 142. The port as formed is illustrated in FIG. 12.

CONCLUSIONS

A hydraulic speed control system has been disclosed which will control not only the rate of movement of a plurality of interconnected carts but will also control the direction of the interconnected carts. The system is also designed so that the carts will always maintain a tension on the linkage, thereby preventing the linkage from snaking or buckling. One form of a load sensing means has been illustrated which clearly provides for a means for adjusting the load on each of the carts so that each will pull by an equal amount. The hydraulic system used to cooperate with the speed control system has also been fully disclosed. It is obvious that modifications and changes in the particular linkages disclosed or in the hydraulic systems or mechanical relationship between the hydraulic system and linkage system can be modified and still be within the spirit and scope of this invention.

What I claim is:

1. A speed and direction control system for a slurry hose transportation system including a plurality of powered carts, slurry hose means, and a linkage means attached to said slurry hose means, said control system comprising:
    a. command means;
    b. locomotion control means on each of said carts;
    c. yieldable means coupling said powered carts to said linkage means;
    d. load sensing means coupled between said powered carts and said yieldable means; and
    e. means coupling said command means through said load sensing means to said locomotion means whereby said command means will operate said locomotion means to move said powered carts in a forward or reverse direction and said load sensing means will vary the operation of said locomotion means to maintain a predetermined load by each cart on said linkage.

2. A system as described in claim 1 wherein said yieldable means includes an arm means attached to said linkage means, and wherein said load sensing means comprises means mounted between said powered cart and said arm means to permit movement of said cart with respect to said hose, said movement being along the axis of said hose, and means responsive to said movement coupled to said locomotion means.

3. A system as described in claim 2 wherein said means responsive to said movement comprises command linkage means connected between said first and second means.

4. A system as described in claim 2 wherein said arm means comprises a yoke having first and second downwardly extending arms and a center mounting arm, shaft means attached to said cart and extending parallel to the axis of said hose and slidably journaled in said downwardly extending arms, spring means mounted over said shaft means and between said downwardly extending arms and said attachment to said cart, and command linkage means mounted between said downwardly extending arms and said attachment to said cart.

5. A system as described in claim 4 wherein said command means is coupled to an input of said command linkage means and said locomotion control means is coupled to an output of said command linkage means.

6. A speed control system for a plurality of vehicles consisting of a control vehicle and powered vehicles, comprising interconnecting means; yieldable means interconnecting said vehicles and said interconnection means; said yieldable means providing biased movement in the direction of travel of said vehicles; first and second load sensing means interconnected between said yieldable means and said vehicle and having an input and an output; means for interconnecting said control vehicle to the input of said first load sensing means; vehicle speed control means; means for connecting said speed control means to the output of said first load sensing means; power responsive means; means for connecting said power responsive means to the input of said second load sensing means; and means for interconnecting the output of said second load sensing means to the input of the first load sensing means of another powered vehicle.

7. A system as described in claim 6 wherein said first and second load sensing means each comprises a mechanical linkage.

8. A speed control system for a plurality of carts consisting of a control vehicle and one or more powered vehicles comprising:
   a. linkage means for interconnecting said control vehicle to said one or more powered vehicles;
   b. yieldable means intercoupling said vehicles and said linkage means to permit biased movement of said vehicles along the axis of said linkage means;
   c. load sensing means interconnected between said yieldable means and each of said vehicles to provide an output proportional to the biased movement of said vehicle along said axis and the direction of said movement with respect to a centered position;
   d. command means on said control vehicle for commanding the direction of movement of each of said powered vehicles and for commanding the rate of said movement;
   e. means for communicating said direction and rate commands to said powered vehicles;
   f. means for coupling said load sensing means output to said rate command to provide a net combined signal; and
   g. means responsive to said net combined signal for controlling the speed of said plurality of carts.

9. A speed control system as described in claim 8 wherein said command means on said control vehicle generates a direction and rate command to each powered vehicle simultaneously.

10. A speed control system as described in claim 8 wherein said command means on said control vehicle generates a direction and rate command to the powered vehicle closest to said control vehicle and each said powered vehicle communicates said direction and rate command to each subsequent powered vehicle after said powered vehicle has received said communicated commands.

* * * * *